United States Patent [19]

Shih et al.

[11] Patent Number: 5,358,432
[45] Date of Patent: Oct. 25, 1994

[54] RESILIENT CONNECTORS FOR A GENERATOR/MOTOR ROTOR

[75] Inventors: True T. Shih; James B. Archibald; Thomas B. Jenkins, all of Schenectady; Frederick J. Rink, Jr., Clifton Park; Paul C. Rasmussen, Scahaghticoke; James F. Hopeck, Mechanicville; Robert Nygard, Saratoqa Springs, all of N.Y.

[73] Assignee: General Electric Company, Schenectady, N.Y.

[21] Appl. No.: 62,728

[22] Filed: May 18, 1993

Related U.S. Application Data

[63] Continuation of Ser. No. 800,529, Dec. 5, 1991, which is a continuation-in-part of Ser. No. 680,065, Apr. 3, 1991, abandoned.

[51] Int. Cl.⁵ .................................... H01R 13/05
[52] U.S. Cl. .................................... 439/825; 439/655
[58] Field of Search .............. 439/700, 824, 825, 842, 439/843, 851–857, 861, 885, 654

[56] References Cited

U.S. PATENT DOCUMENTS

| | | | |
|---|---|---|---|
| 2,269,493 | 1/1942 | Thomas | 173/324 |
| 3,453,587 | 7/1969 | Neidecker | 339/256 |
| 3,510,569 | 5/1970 | Gorin | 174/70 |
| 3,842,301 | 10/1974 | Smith | 310/232 |
| 4,013,329 | 3/1977 | Hugin | 339/9 |
| 4,029,978 | 6/1977 | Jager et al. | 310/64 |
| 4,082,411 | 4/1978 | Storck | 339/252 |
| 4,091,299 | 5/1978 | Vitchenko et al. | 310/71 |
| 4,120,557 | 10/1978 | Horrocks | 339/252 |
| 4,155,019 | 5/1979 | Weghaupt | 310/61 |
| 4,345,804 | 8/1982 | Lanoue | 339/9 |
| 4,368,399 | 1/1983 | Ying et al. | 310/270 |
| 4,456,325 | 5/1984 | Benz | 339/256 |
| 4,572,600 | 2/1986 | Nieman | 339/14 R |
| 4,618,793 | 10/1986 | Shizuka et al. | 310/232 |
| 4,629,917 | 12/1986 | Brem | 310/59 |
| 4,712,029 | 12/1987 | Nold | 310/71 |
| 4,752,253 | 6/1988 | Neumann et al. | 439/825 |
| 4,753,616 | 6/1988 | Molitor | 439/787 |
| 4,870,308 | 9/1989 | Sismour, Jr. | 310/71 |
| 5,015,195 | 5/1991 | Piriz | 439/825 |

FOREIGN PATENT DOCUMENTS 2622-361-A 4/1989 France.
1354604 5/1974 United Kingdom.

OTHER PUBLICATIONS

"Guide To Multiple Contact Band Technology", Hugin Industries Inc. Jul. 1989.

Primary Examiner—David L. Pirlot
Attorney, Agent, or Firm—Nixon & Vanderhye

[57] ABSTRACT

A connector design for connecting rotor coil end turns and an exciter/rectifier assembly to a rotor bore copper conductor in a dynamoelectric machine. The design includes a terminal stud or pin sized to be closely received in a telescoping manner in a cylindrical receptacle which is fixedly attached to the rotor windings. A similar cylindrical receptacle extends from the other end of the rotor toward the exciter/rectifier assembly. The stud or pin in each case is also modified to include grooves for accepting resilient, sliding electrical contacts so that a resilient electrical contact is obtained when the stud is positioned within the receptacle. The connector elements are also sufficiently rigid as to withstand shock, centrifugal forces at operational speeds, and rotation direction reversal, but which also allows sufficient radial and axial movement to accommodate coil movement associated with rotor temperature and speed changes while simultaneously maintaining a low resistance current path.

2 Claims, 7 Drawing Sheets

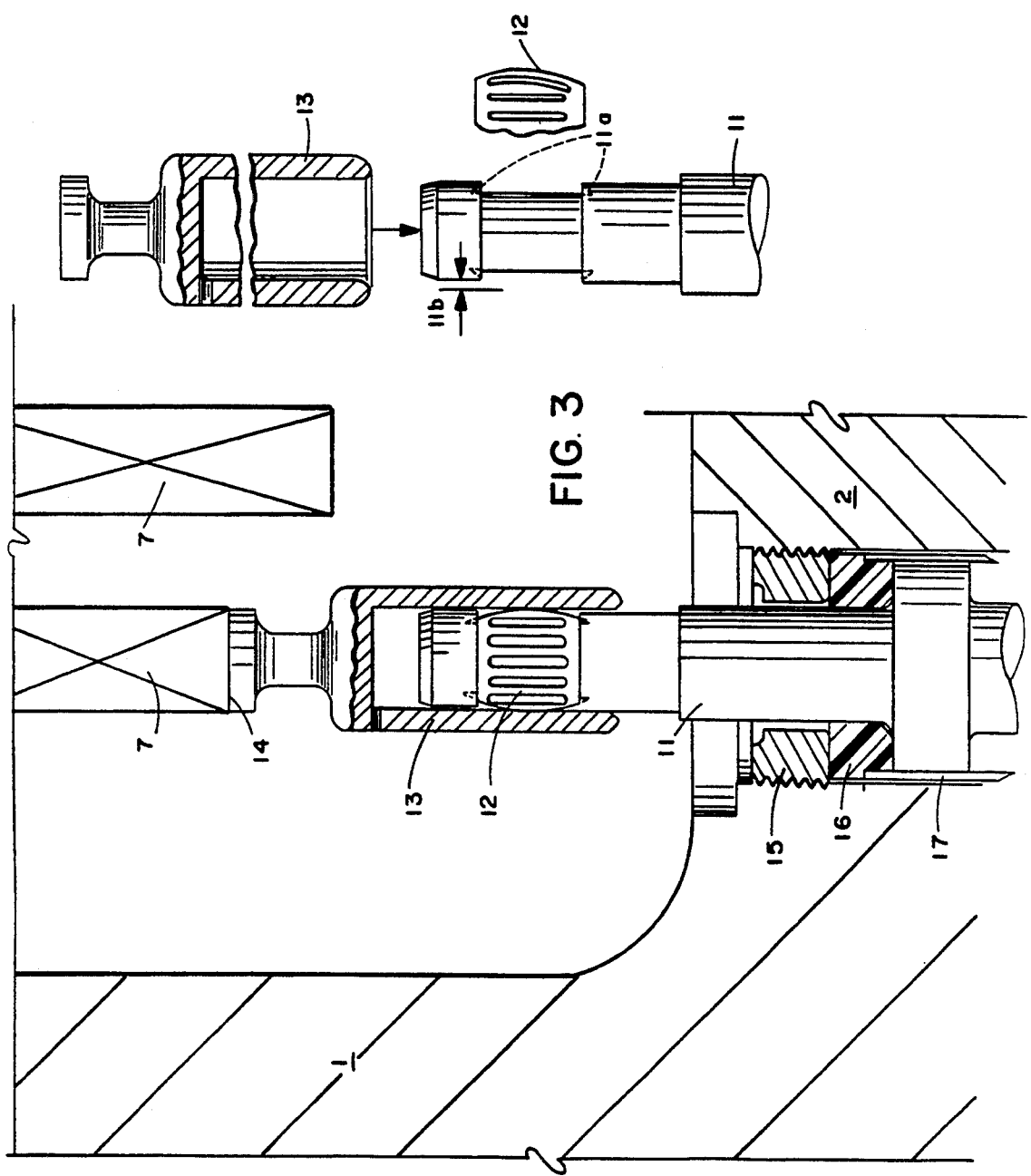

RESILIENT CONNECTORS FOR A GENERATOR/MOTOR ROTOR

This invention was made in the course of Government Contract No. N0024-89-C-4018 with the Department of the Navy, and rights to this invention are determined by the provisions of that contract.

RELATED APPLICATIONS

This is a continuation of U.S. patent application Ser. No. 07/800,529, filed Dec. 5, 1991, now abandoned, which is a continuation-in-part of co-pending U.S. patent application Ser. No. 07/680,065 filed Apr. 3, 1991, and is otherwise related to commonly assigned co-pending U.S. patent application Ser. No. 07/668,902, filed Mar. 13, 1991 entitled "A Main Lead Connector for a Generator/Motor Rotor".

FIELD OF THE INVENTION

The invention relates to improvements in connectors for forming current carrying connections between one end of the rotor bore copper and the field coil, and between the other end of the rotor bore copper and the exciter/rectifier of a dynamoelectric machine.

BACKGROUND AND SUMMARY OF THE INVENTION

The rotors of dynamoelectric machines conventionally have relatively large diameter cylindrical bodies containing field windings for producing magnetic flux which in turn produces stator current and voltage. These field windings are normally carried in a series of longitudinal slots on the outer circumference and extend the length of the rotor body. Rotation of the body particularly at speeds of 3600 rpm, for example, exert high centrifugal forces on the windings which are retained in the rotor slots through the use of dovetail shaped wedges which extend along the length of the rotor body. The manner in which the windings and rotor slots are shaped, insulated and cooled present formidable design problems, particularly for units designed for long term operation under variable load and environmental conditions. In this regard, since the windings extend axially beyond the rotor body and wedge ends and are subjected to the same rotational forces which tend to thrust the winding end turns in a radially outward direction, specially designed structure must be included to prevent such radial movement, as well as for making electrical connections from an exciter, for example, to the windings.

As to the problem of preventing radial movement of the end turns, it is conventional to enclose the winding end turns with retaining rings attached to the rotor body ends by shrink fitting such rings around a circumferential lip at the end of the rotor body. Other means, such as locking keys and the like, are additionally included to maintain the retaining rings securely on the rotor so as to counteract the effects of thermal expansion on the retaining rings.

As to the manner in which electrical connections may be made to the windings from "bore copper" (insulated conductors embedded in the smaller diameter shafts that extend from both ends of the rotor body, and which are ultimately connected to the exciter/rectifier assembly), such field winding connections as found in the prior art are conventionally brazed copper strip of various configurations. These configurations have exhibited premature failures due to cyclic mechanical and electrical duty requirements, which require the connectors to have particular characteristics.

Thus, the main lead connectors between field windings and bore copper, which extend for the most part in a radial direction, must be sufficiently flexible to accommodate coil movements in both axial and radial directions, which are associated with start up, speed and temperature changes, reversal of rotation direction, as well as the shrink fit characteristics of the retaining rings. Additionally, the main lead connector must be sufficiently rigid to withstand both shock and the centrifugal forces present when the rotor is at operating speed. Still further, the connector as part of its electrical cyclic duty requirements must have sufficient cross section to safely carry electric current up to the maximum design amplitude. The connectors must also allow windings to be depressed to allow the assembly of creepage blocks and insulation in the field slots, the field wedges that hold the winding in the field slots, as well as the retaining ring. Accordingly, a desired connector of sufficient cross section must be somewhat rigid and yet somewhat flexible in order to meet contemplated operating conditions and requirements and avoid premature failure, without requiring brazing (which otherwise makes replacement problematic).

At the same time, electrical connections between the other end of the bore copper and the exciter/rectifier assembly at the other end of the rotor have also not been completely satisfactory. One current practice calls for a litz wire or leaf type connection to be brazed between the bore copper and the exciter/rectifier assembly.

Another current practice is to provide a rigid brazed connection between the bore copper and the exciter/rectifier assembly. In both arrangements, bench assembly of the diode assembly and bore copper is required, followed by assembly to the remainder of the machine in the field. Since these brazed joints are located well within the field bore hole, the main lead terminal must be disassembled and bore copper removed for maintenance and/or replacement of parts, such as the diodes.

We have discovered a connector design for the main lead connector which attains a balance between the above noted factors by exhibiting sufficient rigidity as to be substantially unaffected by the centrifugal forces present at operating speed but which, nevertheless, allows sufficient axial and radial movement of winding end turns due to speed and temperature changes as well as providing sufficient current carrying capacity under such varying conditions.

We have also discovered that this same connector may be utilized-to provide a sliding electrical contact between exciter/rectifier and bore copper which is easy to assembly and disassemble, which also provides for thermal growth, and which allows for replacement of the exciter/rectifier diodes without removal of the bore copper and main lead connectors.

These objects are obtained, in one exemplary embodiment, through the use of a telescoping arrangement whereby a terminal stud (or elongated pin), which is similar to a conventional stud design except for the provision of grooves for accepting the multiple contact bands of a Multilam louvered connector or Belleville spring of the nature disclosed by Neidecker in U.S. Pat. No. 3,453,587 issued Jul. 1, 1969. Such louvered connectors are conventionally used for making resilient electrical contact with adjacent electrical conductors in a manner such as is taught by Hugin in U.S. Pat. No. 4,013,329 issued Mar. 22, 1977.

At the lead end, the terminal stud end (with the louvered connector attached) is inserted in a telescoping manner into a circular cylindrical receptacle element which in turn is brazed or otherwise connected to a field winding. The other end of the terminal stud is attached in a conventional manner to the main lead or bore copper of the rotor shaft. In this manner the individual connector elements may be made of rigid construction. However, a flexible connection allowing for both radial and some axial movement is obtained by way of the resilient louvered connector element which forms good electrical contact between the inner surface of the receptacle element and the outer surface of the terminal stud which is closely received in the receptacle or socket.

At the exciter end, the rectifier assembly is provided with round, copper pins or studs into which dovetail grooves are machined to accept and contain Multilam bands (one or two connectors may be utilized for each pin), in a manner similar to that described above with respect to the main lead connector. The bore copper is provided with mating receptacles or sockets, sized to accept the pins and to provide compression of the band or bands, also as discussed above. A large chamfer on both mating parts provides for ease of assembly, and 0-rings may also be provided on the pins to seal against contamination. For those applications where current end pulses with steep rise times can be expected, it may be necessary to insulate the pins to force all of the current through the Multilam louvers.

The above discussed connector is exemplary only. Other resilient connectors allowing radial and axial movement between the components may be employed as well.

Accordingly, it is an objective of the exemplary embodiment disclosed herein to provide a reliable main lead connector for a dynamoelectric rotor which in additional to providing sufficient current carrying capacity is rigid enough to withstand centrifugal forces developed at operating speeds but which is sufficiently flexible as to accommodate coil movements due to changes in speed and temperature, for example.

It is a further objective of the exemplary embodiment of the invention to provide a reliable connector for the bore copper of a dynamoelectric rotor where the bore copper joins to the exciter/rectifier assembly which provides reliable electric contact, easy assembly and disassembly, and which allows replacement of the rectifier diodes without removal of the bore copper and main lead connectors.

Thus, in its broader aspects, the present invention provides, in one exemplary embodiment, an electrical connector for forming a low resistance current path between the rotor bore copper of a dynamoelectric machine and a related component, the connector comprising a cylindrical receptacle member adapted to be attached to the conductor; an elongated cylindrical member adapted to be connected to the terminal and positioned in telescoping relationship within the receptacle member; at least one resilient electrical connector element located between the cylindrical member and the receptacle member, whereby a low resistance electrical contact between the members is maintained and the members are movable with respect to each other.

These and further objects and advantages of the present invention will become more apparent upon reference to the following specification, appended claims and drawings.

BRIEF DESCRIPTION OF THE DRAWINGS

FIG. 3 shows an exemplary embodiment of our telescoping main lead connector including a single resilient louvered electrical connector element;

FIG. 4 is a further partial view of the exemplary embodiment of FIG. 3 but with the illustrated elements disassembled;

DETAILED DESCRIPTION OF THE DRAWINGS

Figure 1:
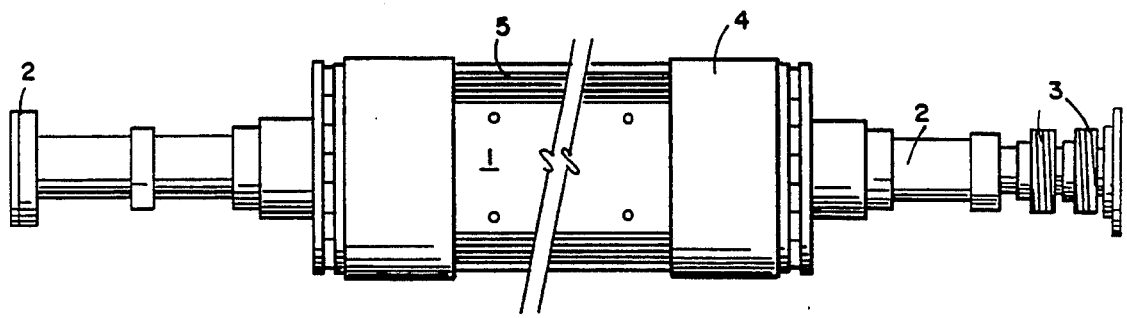
FIG. 1 shows a conventional generator rotor including coil slots, retaining rings and exciter slip rings.

Initially, it is to be noted that elements having the same or similar functions have been designated with the same number in each of the drawing figures.

FIG. 1 shows a general environment in which the disclosed connector designs may be used for forming a low resistance current path in a rotatable body 1, such as the conventional generator rotor shown. The rotor includes a shaft 2 which conventionally includes insulated conductors or "bore copper" running longitudinally between the exciter/rectifier assembly or the slip rings 3 of a collector type machine and rotor winding sections located on the rotor below retaining ring 4.

The relatively large diameter cylindrical body of the generator rotor 1 includes a series of longitudinal radial slots 5 having dovetail shaped longitudinal grooves in the slot sides near the periphery of the rotor. Field windings are inserted in the slots and extend the length of the rotor body with longitudinal wedges located in the dovetail shaped grooves for holding the windings in place against centrifugal forces exerted when the rotor is at operational speed.

The longitudinal sections of the windings extend in an axial direction beyond the ends of the relatively large diameter portion 1. The rotor windings include end turn portions or sections for connecting the longitudinal section in one slot, for example, with that contained in another slot. Since the winding or coil end turn portions are not within a slot, a retaining ring 4, such as is generally illustrated in FIG. 1, is conventionally included on the rotor body by shrink fitting techniques or other conventional means. The function of such rings is that of resisting the centrifugal force on the winding end turns when the rotor is at operational speed so as to restrain the end turn sections from moving in a radially outward direction and thus prevent damage to the rotor windings.

Figure 2A:
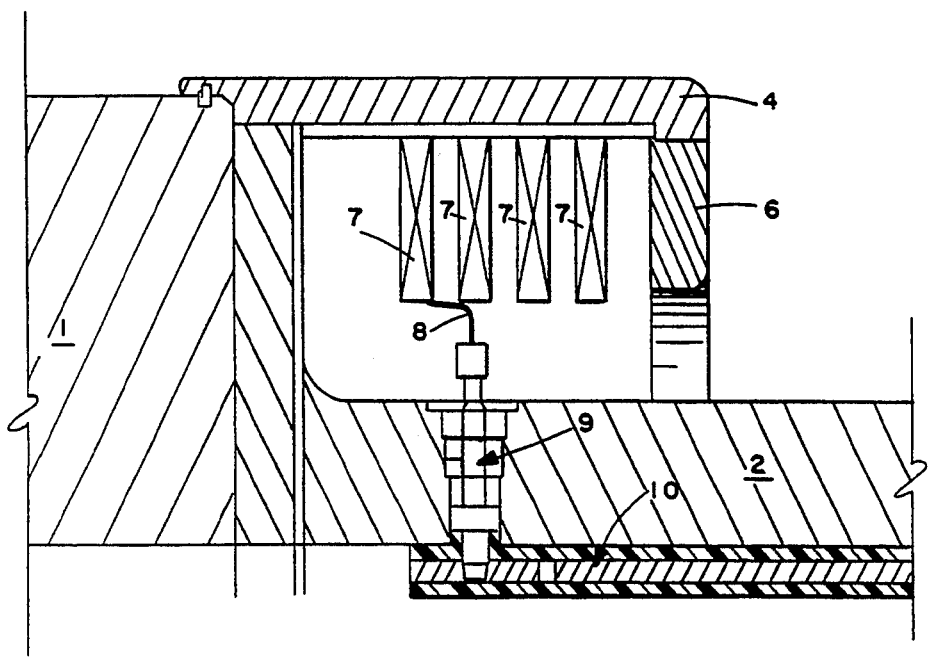
FIGS. 2a, 2b and 2c show three conventional main lead connector arrangements for forming an electrical connection between the rotor bore copper and a rotor coil end turn section.
Figure 2B:
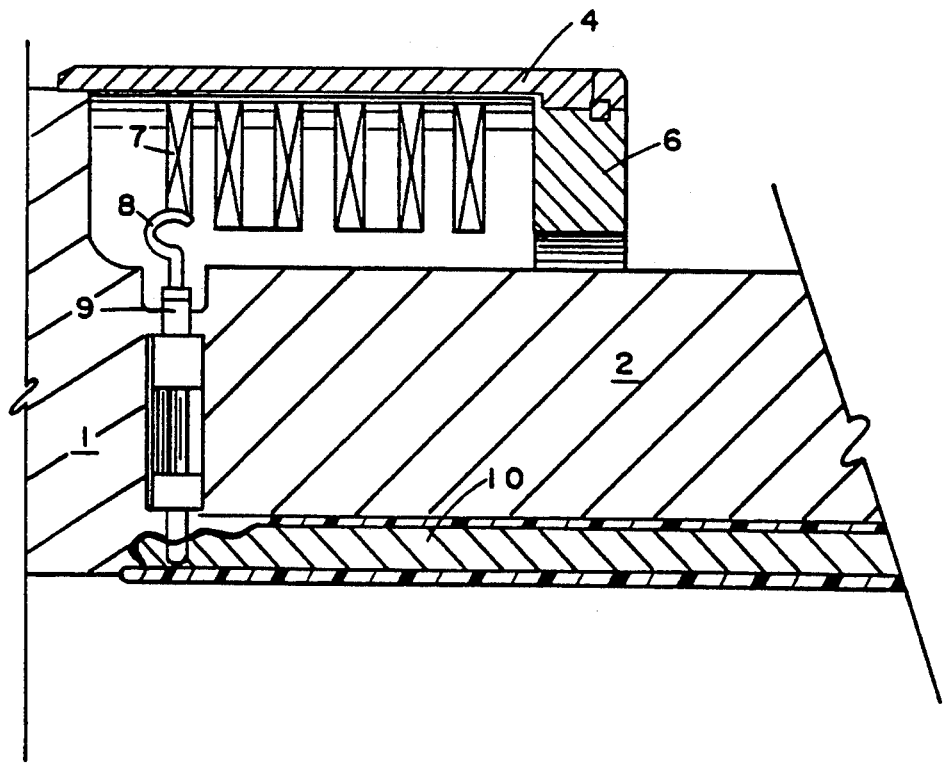
Figure 2C:
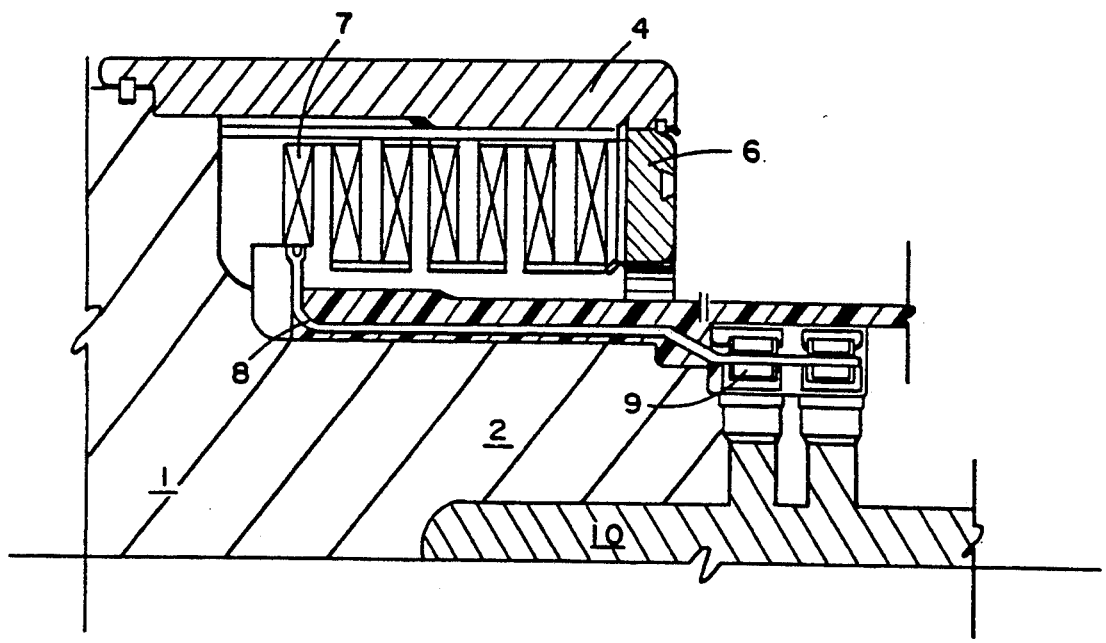

FIGS. 2a, 2b, 2c show three conventional retaining ring (4) and winding end turn (7) arrangements attached to the end of a rotor body 1. Such arrangements conventionally include centering rings 6, bore copper or insulated conductors 10 within the rotor shaft portion 2 for carrying exciter current, for example, to the windings, as well as terminal studs 9, which form part of the electrical current path to a winding 7, for example. FIGS. 2a, 2b and 2c additionally illustrate that it is conventional to include main lead connectors 8 between a winding 7 and a terminal stud 9. As is generally illustrated in the figures, the main lead connector 8 is conventionally formed of copper strip and may take various forms, such as those illustrated in U.S. Pat. Nos. 4,368,399 to Ying et al and 4,870,308 to Sismour, for example.

As previously noted, however, such main lead connectors are subject to centrifugal forces, as well as speed and temperature changes, during generator or motor operation, and such factors may lead to premature failures of the connectors. However, a main lead connector, as illustrated in FIGS. 3 and 4, for example, is designed to be sufficiently rigid as to withstand the centrifugal force present at rotor operating speeds but, nevertheless, sufficiently flexible as to accommodate coil movements associated with shrink fit retainer rings, as well as speed and temperature changes. Moreover, the use of, for example, a "Multilam" or other suitable resilient, sliding-type electrical connector element 12 will provide and maintain a low resistance current path notwithstanding radial and axial movement of the connector elements. Such louvered electrical connector elements are conventional as previously indicated.

As illustrated in FIGS. 3 and 4, the main lead connector includes a terminal stud 11 of conventional design except that it has been provided with a circumferential groove 11a shaped as indicated in FIG. 4, and the terminal stud is also sized to be closely received within connector receptacle member 13. Both members 11 and 13 in cross section are preferably circular cylinders, although, as will be appreciated by the artisan, other shapes may be used. Additionally, both members 11 and 13 are preferably of a high conductivity alloy, such as chromium-copper, but other materials may be substituted.

As will be appreciated from a consideration of FIGS. 3 and 4, terminal stud member 11 with electrical connector 12 attached thereto is received in a telescoping relationship within receptacle member 13. Resilient element 12 extends beyond the inside diameter of element 13 by a "throw" distance 11b which may, for example be approximately 50 mils. A careful selection of distances and element sizes will insure the establishment and maintenance of a low resistance current carrying path of sufficient current carrying capacity for a wide variety of specific applications.

As will also be appreciated from a review of the drawings, receptacle member 13 may be attached to winding end turn section 7 in a conventional manner, such as by brazing at 14. Additionally, terminal stud member 11 may be connected to bore copper 10 within shaft 2 in a conventional manner, such as through the use of a threaded element 15 and insulating elements 16 and 17, for example.

Additionally, a close review of FIGS. 3 and 4, for example, will indicate that elements 11 and 13 are relatively free to move with respect to each other, notwithstanding the frictional engagement of elements 12 and 13. That is to say, the radial movement of end turn 7 can easily be handled by the sliding engagement between terminal stud 11 and receptacle member 13 while simultaneously forming a good electrical contact by way of element 12.

Furthermore, the spacing between elements 11 and 13, as well as the resilient nature of element 12, also allows for a small amount of axial movement of the end turn.

Figure 5:
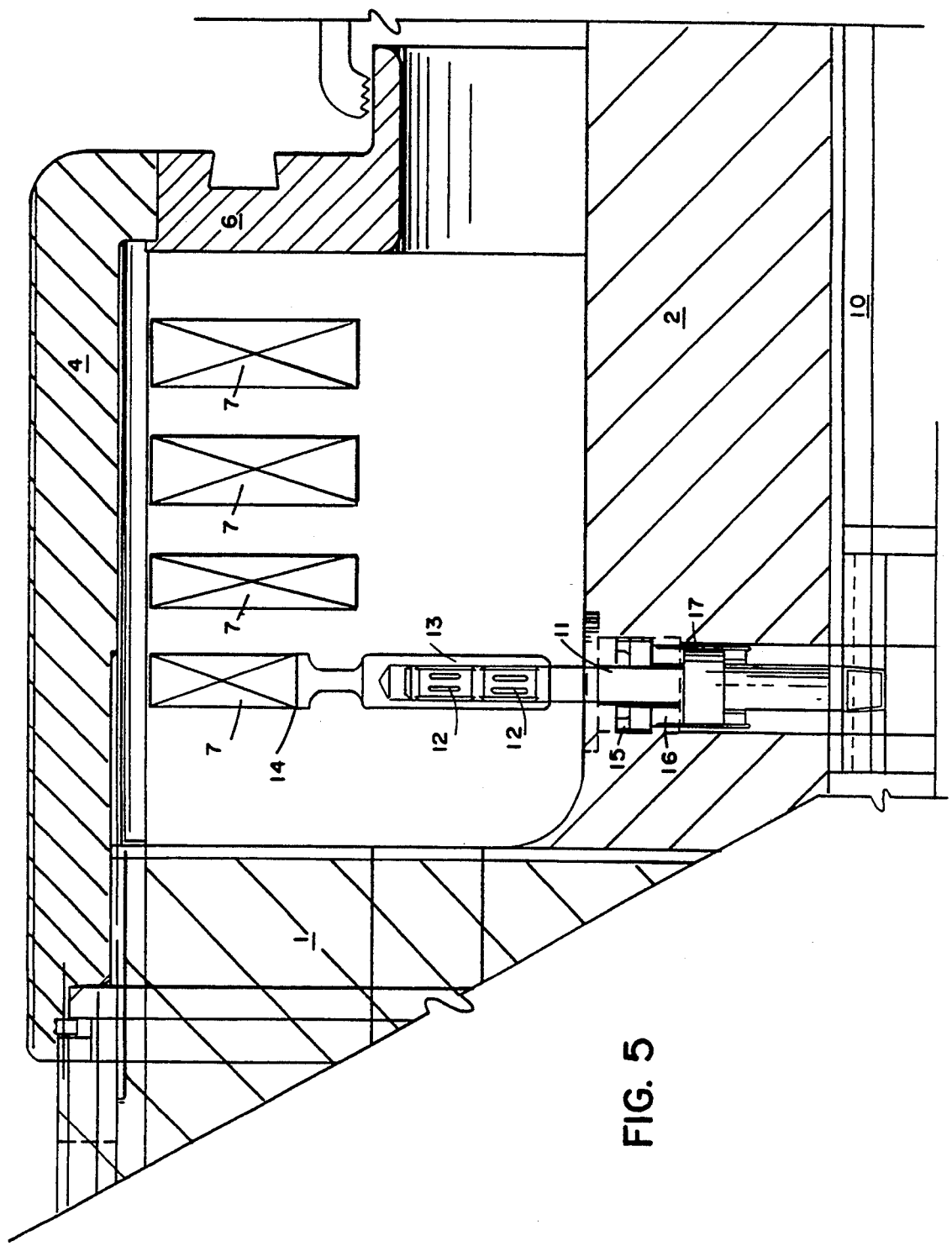
FIG. 5 illustrates another exemplary embodiment of our main lead connector which has been modified to include two resilient louvered electrical connectors.

FIG. 5 illustrates a main lead connector of the nature shown in FIG. 3 in an environment similar to that of FIG. 2a, but with the terminal stud modified to carry two exemplary, resilient, sliding electrical connectors for higher current carrying capacity. As will be appreciated by the artisan, the number and size of the resilient electrical connectors may be varied in accordance with the requirements of a particular application. Similar observations may be made with regard to the size, relative dimensions and materials selected for cylindrical members 11 and 13. Furthermore, as will be recognized by those skilled in the art, resilient connector 12 may be attached to the inside peripheral surface of receptacle element 13 by the inclusion of one or more grooves therein rather than being attached to the outside surface of terminal stud 11.

Figure 6:
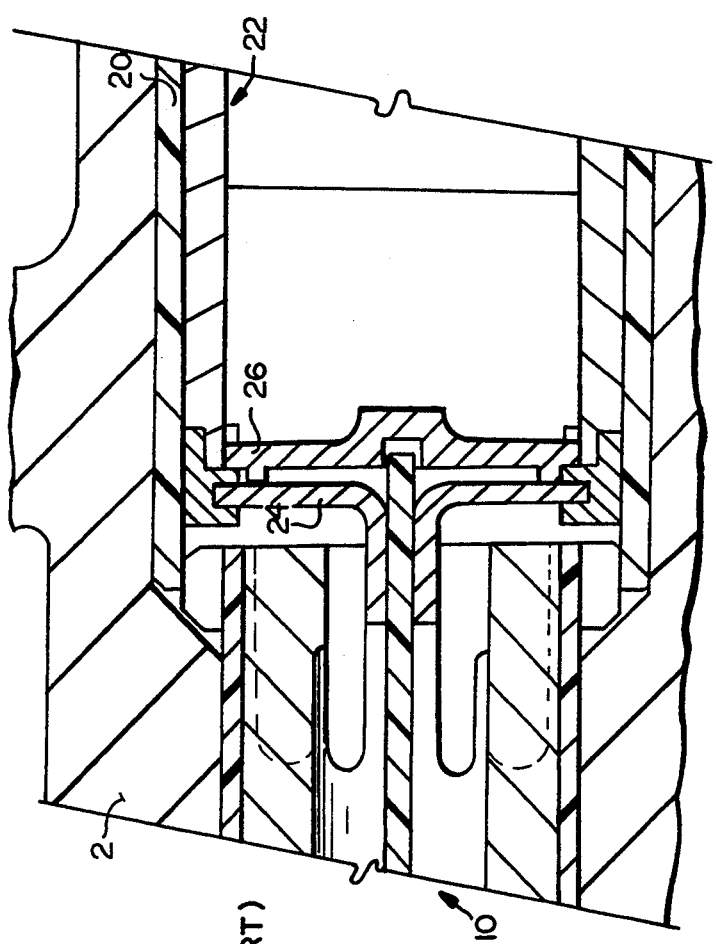
FIG. 6 is a partial section, illustrating a conventional connector arrangement between the rotor bore copper and an associated exciter/rectifier assembly.

Turning now to FIG. 6, there is shown a conventional electrical connection between the bore copper conductor 10 and an exciter/rectifier assembly 20 which includes a diode assembly (partially shown) 22. In this arrangement, adjacent connectors 24, 26 are brazed to form a rigid electrical connection therebetween.

Figure 7:
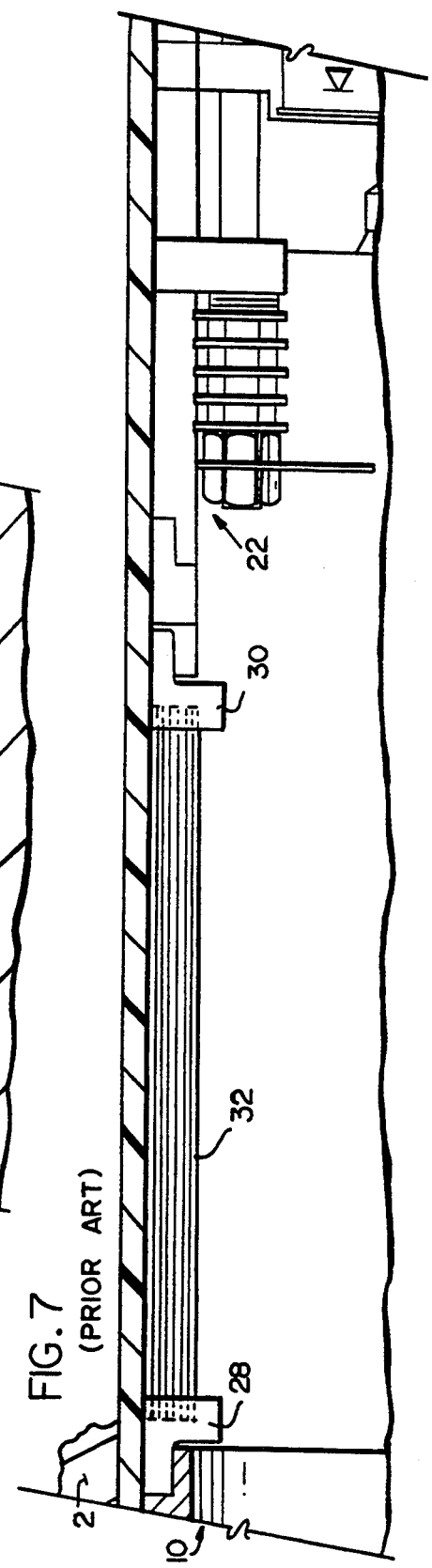
FIG. 7 is a partial section, illustrating another conventional connector arrangement between the rotor bore copper and an associated exciter/rectifier assembly.

In FIG. 7, another conventional arrangement is disclosed wherein terminal studs 28 and 30 of the bore copper and exciter/rectifier assembly, respectively, are electrically connected by litz wire 32 (or a leaf type bar), with the litz wire brazed at either end to the terminals 28, 30.

As previously explained, the conventional arrangements as illustrated in FIGS. 6 and 7 require disconnection of the main lead connector and removal of the bore copper in order to replace diodes within the exciter/rectifier assembly 20.

Figure 8:
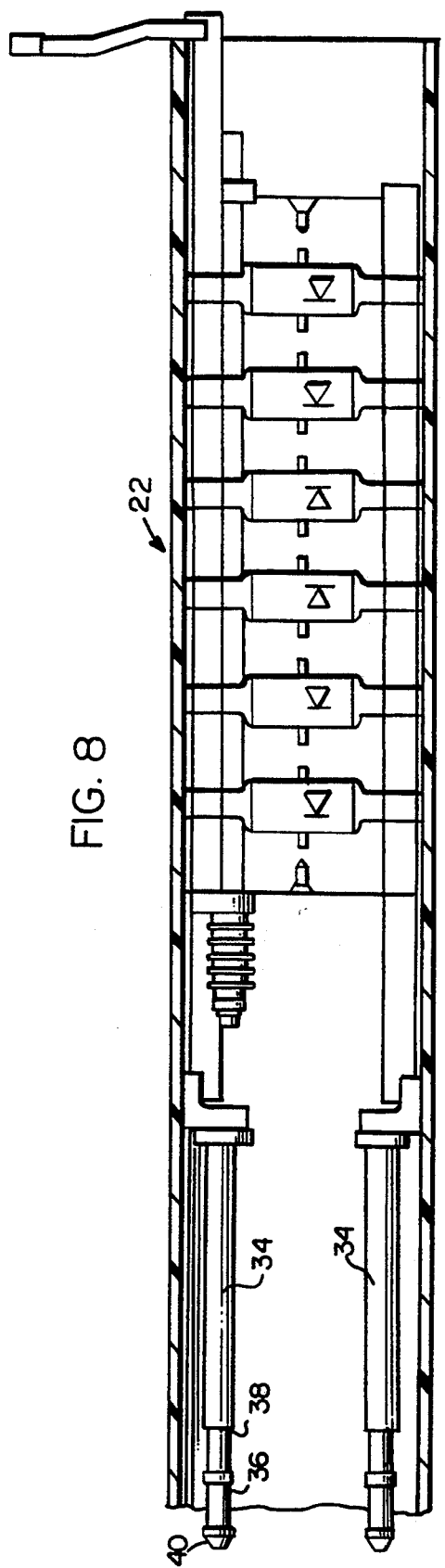
FIG. 8 illustrates a diode assembly removed from an exciter/rectifier assembly, and provided with elongated pin connectors, each adapted to receive a pair of resilient louvered electrical connector elements in accordance with an exemplary embodiment of the invention.
Figure 10:
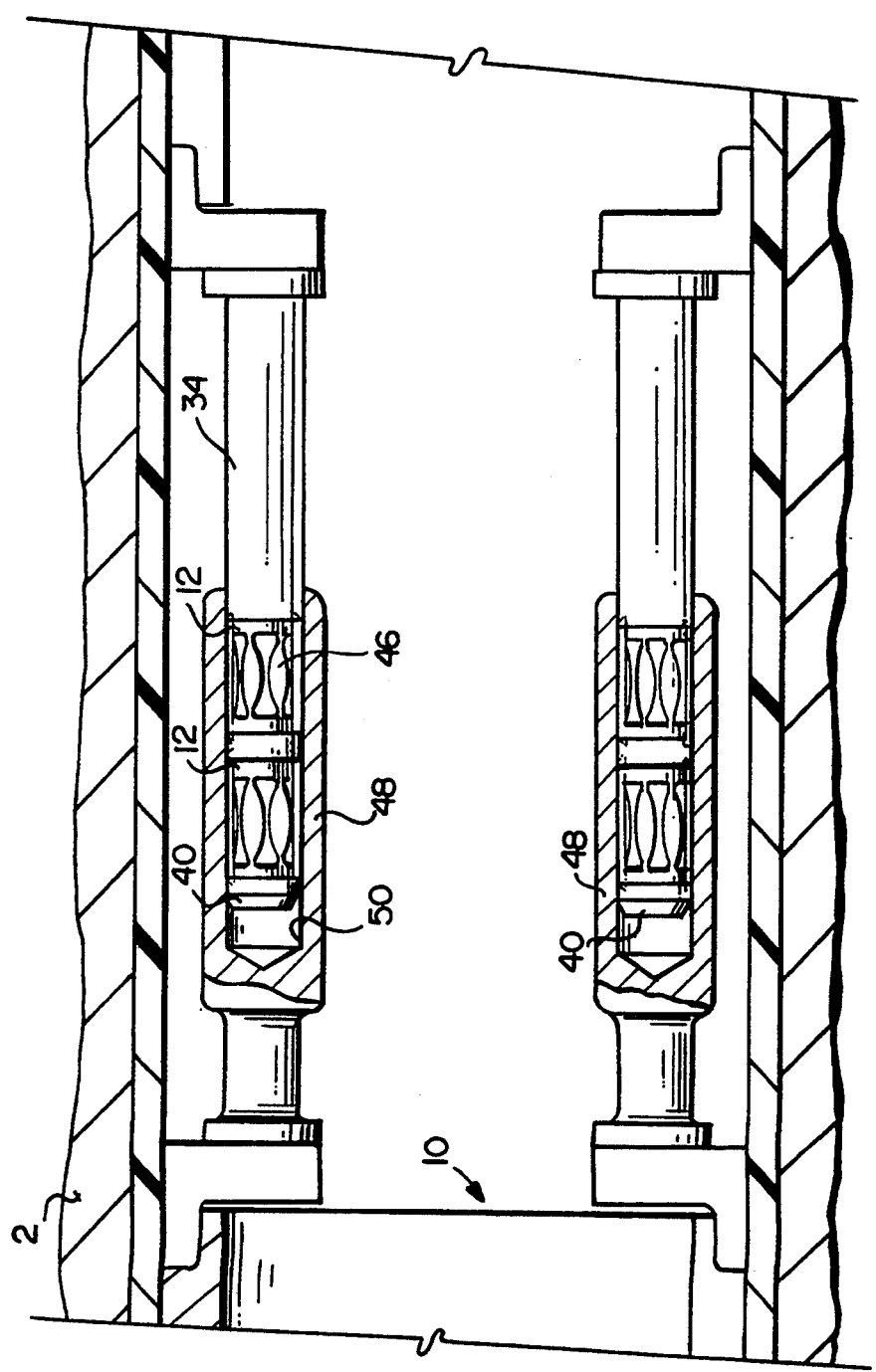
FIG. 10 is a partial perspective view of a Multilam band as utilized in exemplary embodiments of this invention.

In accordance with an exemplary embodiment of this invention, and with reference to FIG. 8, the diode assembly 22 is illustrated with a pair of elongated connector studs or pins 34 extending therefrom. Each connector pin 34 is provided with a pair of axially spaced dovetail type grooves 36, 38, each designed to receive, for example, a Multilam connector band 12 as shown in FIG. 10. The forward end of each connector pin 34 is chamfered as at 40 to facilitate ease of insertion within a mating socket (described below) provided on the bore copper.

With reference to FIG. 10, the Multilam band 12 comprises a resilient louvered strip with laterally spaced end strips 42, 44 connected by a series of louvered elements 46. As indicated earlier, this is a commercially available contact manufactured by Huggin Industries Inc. which is suitable for use in this invention.

Figure 9:
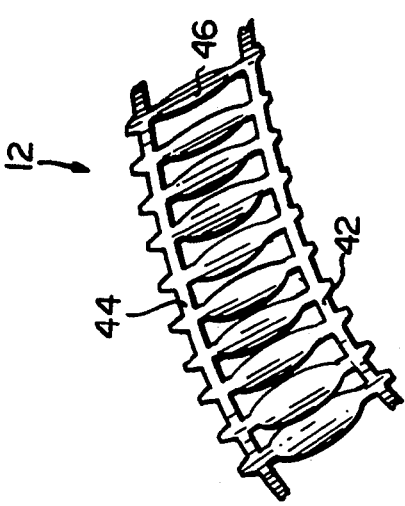
FIG. 9 is a partial enlarged view illustrating the telescoping electrical connection between the bore copper and the diode assembly shown in FIG. 8.

Turning to FIG. 9, the pin connectors 34 are shown in full mating engagement with a pair of aligned receptacles or sockets 48 extending from the bore copper 10. Each socket 48 is provided with an internal bore 50 which is sized to engage a respective pin connector 34 such that the electrical connector bands 12 are held in compression to provide a reliable electrical connection.

Figure 11:
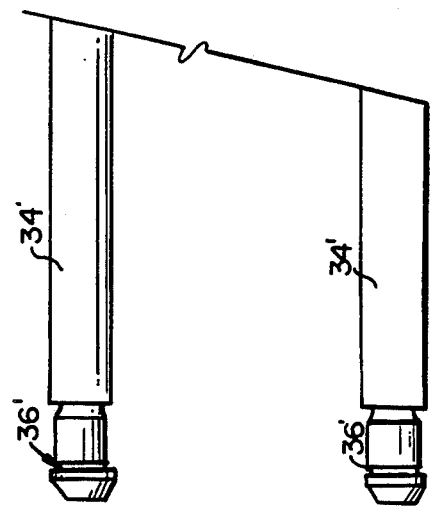
FIG. 11 is a partial side view of a modified pair of pin connectors, each adapted to receive a single resilient louvered electrical connector element, in accordance with another exemplary embodiment of the invention.

In FIG. 11, an alternative connector is illustrated wherein each pin 34' includes only a single dovetail type groove 36' for receiving a single resilient band 12.

It will be appreciated that by customizing the size of the pin 34 and socket 48 along with the thickness and number of louvers 46 on the contact bands 12, the current capacity can be adjusted as desired, up to several thousand amps.

It will be further appreciated that other resilient sliding connectors which accommodate slight axial and radial movements, and which tolerate slight misalignment of components, may also be employed advantageously in this invention.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. In a dynamoelectric machine having a rotor bore conductor extending between a field winding and an exciter/rectifier assembly, a first resilient electrical connection between said bore conductor and said field winding and a second resilient electrical connection between said bore conductor and said exciter/rectifier assembly; said first resilient electrical connection comprising a first receptacle member attached to said field winding, and a first terminal stud extending from said bore conductor, said first terminal stud having at least a first resilient connector band located circumferentially about said first terminal stud, said terminal stud and said at least one connector band telescopingly engaged within said first receptacle member; and said second resilient electrical connection comprising a second receptacle member attached to said bore conductor and a second terminal stud extending from said exciter/rectifier assembly, said second terminal stud having at least a second resilient connector band circumferentially located about said second terminal stud, said second terminal stud and said second resilient connector band telescopingly received within said second receptacle member.

2. The dynamoelectric machine of claim 1 wherein each of said first and second resilient connector bands comprises a pair of laterally spaced end strips connected by a plurality of spaced louver elements.

* * * * *